3,469,990
TRACERS
Sylvan Eisenberg, 2101 Wawona,
San Francisco, Calif. 94116
No Drawing. Filed Apr. 6, 1966, Ser. No. 540,499
Int. Cl. A23k 1/00
U.S. Cl. 99—2     3 Claims

ABSTRACT OF THE DISCLOSURE

The combination with a mixed animal feed of a tracer for the feed supplement or micro-ingredient portion of said feed, said tracer comprising a finely divided water-insoluble vehicle and a water-soluble dye adsorbed by said vehicle, the vehicle being characterized by the property of strongly adsorbing the dye to such a degree that the dye cannot be fully eluted from the vehicle in its entirety by water or steam.

---

This invention relates to the same art as applicant's prior U.S. Patent No. 2,868,644. An important difference between the tracers of this invention and the tracers described in that patent is that the carrier of the tracers of this invention strongly adsorbs water-soluble dyes to the point where these dyes cannot be fully eluted from the carrier by water or steam, thereby rendering the tracers of this invention satisfactorily usable in feeds containing high levels of water-containing additives and in pelleted feeds where steam has been employed in the pelleting operation.

The essential object and purpose of the present invention is to provide a tracer comprising a water-soluble dye and a water-insoluble carrier, the latter having a sufficiently high adsorbent power for the dye so that the adsorbed dye cannot be fully eluted by water or steam but can be finally eluted by a stopped solvent, such as methanol.

The preferred carrier for the herein tracers is graphite. National Carbon Company's Grade BB–5, 95% passing through 35 mesh but retained on 150 mesh, is a good choice as to grade, having been approved by the U.S. Department of Agriculture as an additive in cleaning compounds for dairy equipment. This grade of graphite is essentially inert, with less than 0.06% of it being soluble in a variety of active solvents and only 0.5% of it being soluble in hydrochloric acid. The addition of as much of it as 50 p.p.m. to an animal feed can contribute at most 0.25 p.p.m. of potentially soluble material.

The tracers are produced by first dry-blending up to 2% by weight of water-soluble FD & C colors with graphite. Water is then added to the dry mixture in just sufficient amount to dissolve the dye and to form a slurry. During the existence of the slurry condition dye is adsorbed by the graphite. The slurry is then dried to produce a free-flowing granular product which is packaged after sifting to remove lumps and fines.

Activated carbon granules function similarly to graphite with respect to adsorbing the water-soluble dye material so strongly that it may not be fully eluted with water. However, activated carbon granules have considerably more surface area per unit of weight than graphite granules and therefore adsorb much more dye than the latter. As a consequence, much more water is needed in the forming of the carbon-dye-water slurry, and the drying of the carbon slurry is considerably more costly than the drying of the graphite slurry. For this reason graphite is preferred over activated carbon.

A suitable formulation for activated carbon is as follows:

Activated carbon (130 particles/mgm.) ___grams__ 200
Violet #1 _____do____ 2.5
Water _____ml___ 100

The slurry is dried, the dried product is screened, retaining all which passes 35 mesh but which remains on 100 mesh.

Both graphite and activated carbon strongly adsorb all of the usable water-soluble dyes to the point where the dyes cannot be fully eluted by water. By way of examples of such dyes are the following FD & C colors: Violet #1; Green #1; Green #2; Green #3; Red #1; Red #2; Red #3; Blue #1; Blue #2; and Yellow #6.

The subject tracer, which is easily identifiable and statistically determinable, is premixed with the micro-ingredient which is ordinarily identifiable and determinable with difficulty. The tracer need not be added at levels contributing more than 50 p.p.m. to the finished feed. The premix is next mixed with the feed. Samples from this final mix then contain both micro-ingredient and tracer.

A preferred method for the detection of the tracer in samples of the finished feed involves the use of the following materials and steps:

MATERIALS (1) A balance capable of weighing to ±0.1 g.
(2) Whatman #1 filter paper, 9–15 cm. circles
(3) Beakers, 50 ml.
(4) Hot plate large enough to hold 4 sheets of filter paper
(5) An aluminum plate of same size as hot plate
(6) Carbon tetrachloride
(7) Water
(8) Methanol
(9) A small brush

STEPS (1) Prepare feed pellets for assay by grinding 25 g. in Waring Blendor for ½ minute. Mash feed requires no preparation.

(2) Transfer 5.0 g. to beaker. Use unit multiples or submultiples of 5.0 g. as necessary to yield spot counts of between 9 and 36 per assay. Samples from premixes may be 100 mg. or less, and in such cases one may proceed directly to step 5 below.

(3) Add about 25 ml. carbon tetrachloride to beaker, swirl to thoroughly wet sample, and let stand about ½ minute until most of feed rises to top.

(4) Carefully decant floating feed and solvent, avoiding loss of sediment.

(5) Dry the sediment by putting beaker on hot plate.

(6) Place filter paper on aluminum plate and wet paper thoroughly. Use methanol for detection of the tracer. Remove excess fluid by holding plate vertically.

(7) Transfer dry sediment to paper by rotating beaker at an increasing angle over paper, making beaker about so that sediment is spread uniformly. Use brush to transfer last of sediment.

(8) Soon after first spots of color appear, or within about 2–3 minutes, place aluminum plate on hot plate to dry the paper.

(9) Remove sediment from dry paper, and count colored spots remaining on paper.

What is claimed is:
1. A composition of matter in the form of a generally homogeneous admixture, said admixture being comprised of a major portion of an animal feed, a minor portion of a feed supplement or micro-ingredient, and on the order of magnitude of about fifty parts per million of a tracer, said tracer comprising a finely divided water- insoluble vehicle and a water-soluble dye adsorbed by said vehicle, said vehicle being selected from the group of materials consisting of graphite and activated carbon.

2. The composition of matter of claim 1, said tracer having a particle size within the range of about 35 mesh to about 150 mesh.

3. In combination, in the form of a generally homogeneous admixture, a major portion of a feed supplement or micro-ingredient for a mixed animal feed, and a minor portion of a tracer therefor, said tracer comprising a finely divided water-insoluble vehicle and a water-soluble dye adsorbed by said vehicle, said vehicle being selected from the group of materials consisting of graphite and activated carbon.

References Cited

UNITED STATES PATENTS

| 2,712,997 | 7/1955 | Cooley | 99—2 |
|---|---|---|---|
| 2,868,644 | 1/1959 | Eisenberg | 99—2 |

OTHER REFERENCES

Easton et al., Chemistry and Industry (London), pp. 1863–4, 1964.

A. LOUIS MONACELL, Primary Examiner

NORMAN ROSKIN, Assistant Examiner

U.S. Cl. X.R.

23—209.2; 252—444